US005694961A

United States Patent [19]

Begemann et al.

[11] Patent Number: 5,694,961

[45] Date of Patent: Dec. 9, 1997

[54] DEVICE AND METHOD FOR CHANGING THE FLOW RESISTANCE OF A FLUID FLOW CONTROL DEVICE

[75] Inventors: Ulrich Begemann, Leonberg; Helmut Heinzmann, Bohmenkirch; Wolfgang Ruf, Heidenehim, all of Germany

[73] Assignee: J.M. Voith GmbH, Heidenheim, Germany

[21] Appl. No.: 503,914

[22] Filed: Jul. 19, 1995

Related U.S. Application Data

[63] Continuation of Ser. No. 199,107, Feb. 22, 1994, abandoned.

[30] Foreign Application Priority Data

Feb. 25, 1993 [DE] Germany .......................... 43 05 688.1

[51] Int. Cl.⁶ ........ F16K 31/12

[52] U.S. Cl. ........ 137/2; 137/504; 138/45

[58] Field of Search ........ 138/45; 137/2, 137/504; 251/5

[56] References Cited

U.S. PATENT DOCUMENTS

| | | | |
|---|---|---|---|
| 2,018,316 | 10/1935 | Owings | 81/125 |
| 2,667,900 | 2/1954 | Cantalupo | 138/45 |
| 2,764,183 | 9/1956 | Gollehon | 138/45 |
| 3,118,646 | 1/1964 | Markey | 251/5 |
| 3,195,586 | 7/1965 | Vogt | 251/5 X |
| 3,214,903 | 11/1965 | Cochran | 138/45 X |
| 3,338,049 | 8/1967 | Fernberger | 138/45 X |
| 3,693,484 | 9/1972 | Sanderson, Jr. | 81/176.15 |
| 3,970,105 | 7/1976 | Pelton | 138/45 X |
| 4,254,791 | 3/1981 | Bron | 138/45 X |
| 4,609,014 | 9/1986 | Jurjevic et al. | 138/45 |

*Primary Examiner*—John Fox

*Attorney, Agent, or Firm*—Marshall, O'Toole, Gerstein, Murray & Borun

[57] ABSTRACT

An apparatus and method for variably controlling fluid flow in a closed flow line, especially the flow of a pulp suspension through a headbox of a paper-making machine, includes guiding fluid through a cavity of a conduit having at least two different cross-sectional profiles. Fluid flow resistance is adjusted by changing the contour of an edge defined by the conduit and a transition step connecting the two cross-sections.

2 Claims, 1 Drawing Sheet

DEVICE AND METHOD FOR CHANGING THE FLOW RESISTANCE OF A FLUID FLOW CONTROL DEVICE

This is a continuation of U.S. application Ser. No. 08/199,107, filed Feb. 22, 1994, now abandoned.

BACKGROUND OF THE INVENTION

1. Field of the Invention

The invention relates to devices and methods for changing fluid flow resistance in a conduit and more particularly to devices and methods for variably changing fluid flow resistance in a fluid flow control device by changing the geometry of the device at entrance and discharge portions of a narrow part of the device.

2. Description of Related Technology

The fluid flow resistance in a line system may be increased by increasing frictional resistance in a conduit defining a cavity through which fluid flows by utilizing a fluid control device which substantially changes the size of a cross-section of the cavity. Such a control device may be a flexible element which is inserted into the conduit. With respect to the direction of flow of a fluid through a conduit, such a state of the art flow control device may provide an unbroken (i.e. continuous) reduction of the cavity cross-sectional area up to a narrowest cross-section and then gradually widen the cavity in a continuous, unbroken manner. Control devices of this type find application in various known devices such as membrane valves and tube clamps.

A drawback to control devices of this type is that they exhibit a small flow amplification factor (i.e., the change in the flow resistance resulting from the change of cross-sectional area of a conduit is small). For this reason, a very narrow cavity cross-section (i.e. small gap width) is necessary to produce even a small fluid flow controlling effect. This may be undesirable, for example, when a solid-containing fluid, such as a pulp suspension, flows through such a device in a paper machine because there is a considerable danger of blockage. Furthermore, such devices may increase the possibility of the formation of fiber agglomerations or clumps.

SUMMARY OF THE INVENTION

It is an object of the invention to overcome one or more of the problems described above. In particular, it is an object of the invention to influence the flow of fluids, such as a pulp suspension, in a conduit and provide an extremely large flow amplification factor in a small operating region, such as a headbox of a paper machine. It is also an object of the invention to utilize small changes in the geometry of a flow control device to change flow resistance while avoiding blockage and the formation of fiber flocs or clumps.

A method according to the invention for variably controlling fluid flow in a closed flow line having an arbitrary cross-sectional form includes passing fluid through a fluid control conduit having first and second conduit portions each having a discrete cross-sectional profile. A transition edge is disposed between the first and second conduit portions. The fluid flow resistance is adjusted in the fluid control conduit by changing the contour of the transition edge.

A device according to the invention includes at least two connected conduits which define a cavity through which fluid flows. Each conduit has a discrete substantially constant cross-sectional profile whereby a transition step is formed between the first conduit and the second conduit. The transition step defines an edge which can be adjusted between a sharp and a rounded contour.

Other objects and advantages of the invention will be apparent to those skilled in the art from the following detailed description taken in conjunction with the drawings and the appended claims.

DETAILED DESCRIPTION OF THE INVENTION

Figure 1:
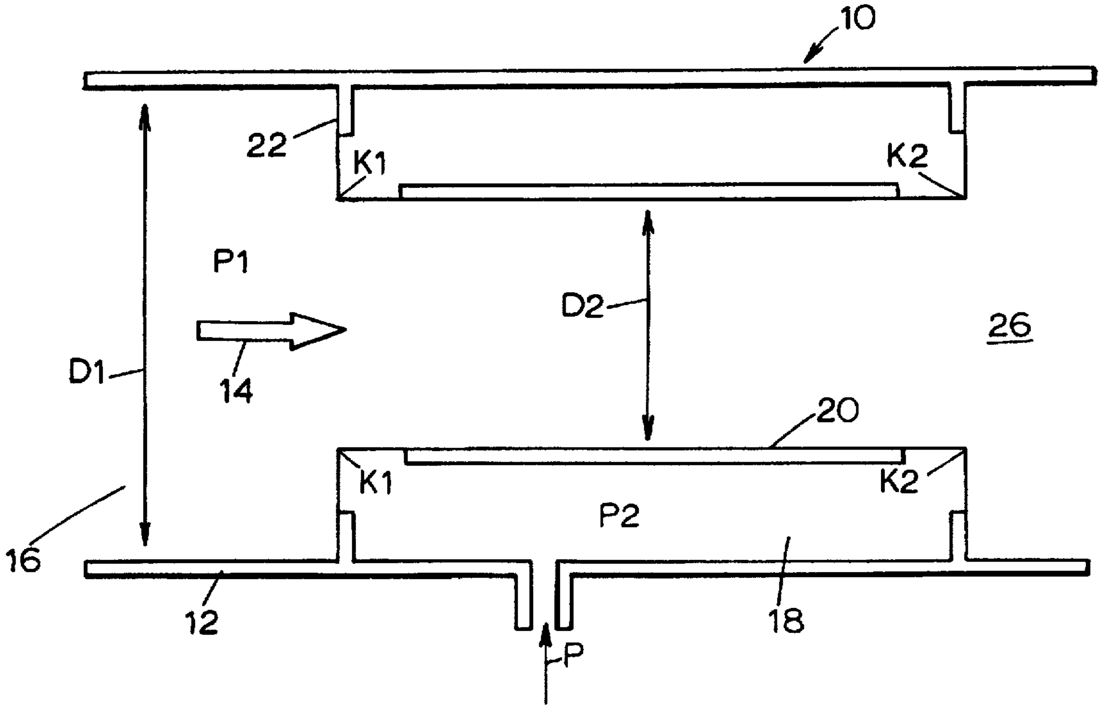
FIG. 1 is a partially schematic sectional view of a flow control device according to the invention showing P1≡P2.

Unlike some of the known prior art fluid control devices, a device and method according to the invention does not influence fluid flow resistance in a pipe by changing the wall friction of a control element disposed in the pipe. Rather, according to the invention, a flow cavity of a pipe is narrowed or widened in an abrupt or broken manner (i.e. a discontinuous fashion) and small contour changes are made to the radius of an edge disposed at a narrow portion of the cavity. These small geometrical adjustments produce significant differences in the fluid flow resistance at entrance and discharge locations of the device.

Entrance and discharge fluid flow resistances can be calculated utilizing the continuity form of the Bernoulli equation and the momentum theorem for ideal, sharp-edged non-continuous cross-sectional area changes as follows:

$$\zeta_{in}=(A_2/A_0-1)^2 \quad (1)$$

$$\zeta_{out}=(A_3/A_2-1)^2 \quad (2)$$

where $\zeta_{in}$ is entrance resistance;

$\zeta_{out}$ is discharge resistance;

$A_0$ is a cross-sectional area of a contracted fluid jet;

$A_2$ is a cross-sectional area of a fluid control device cavity at a contracted location; and $A_3$ is a cross-sectional area of a pipe cavity subsequent to the control device (with respect to the direction of fluid flow).

Experiments as well as theoretical considerations have shown that the entrance and discharge fluid flow resistance at a discontinuous narrowing or widening of a pipe corresponds to equations (1) and (2) above only when an edge defined by a transition step between pipe sections of discrete cross-sectional profiles has an infinitely small edge radius R. Furthermore, the flow resistance decreases significantly for small changes of R. Thus, when a transition edge is flattened slightly (i.e. the edge radius R is increased), the effective flow cross-section $A_0$ changes very considerably in relation to the change of the edge radius R. Therefore, a large effect on the change of the resistance $\zeta_{in}$ results. The invention utilizes this effect by exercising an influence on the edge radius R by suitable means, as will be further described herein. As a result, effective changes in fluid flow resistance are produced with slight changes in the geometry of the fluid control device.

The inventive device and method are advantageous because the change of geometry of the device necessary to vary fluid flow through a system is so small that the inventive device may be utilized to control flow throughputs, especially the headboxes of paper machines.

For this reason, the problem of pulp suspensions forming fiber flocs or clumps, for example, at gaps and recesses in the head box can be eliminated. Furthermore, a device according to the invention requires little space, making it desirable for use in a turbulence insert of a paper machine.

Additionally, because a device and method according to the invention requires almost no mass movement to change the contour of a transition edge of a flow conduit, it is possible to provide very flexible and fast-reacting automatic control of fluid flow resistance in a pipe.

FIG. 1 shows a variably adjustable flow control device, generally designated 10 according to the invention including a flow conduit or pipe 12 having a diameter D1 and the direction of fluid flow shown by an arrow 14. The pressure in the pipe 12 is P1. The pipe 12 defines a cavity 16 which changes from the diameter D1 to a smaller diameter D2. The two resulting cross-sectional profiles of the pipe cavity are discrete and each profile is preferably substantially constant. A pressure region 18 having outside pressure P applied thereto to result in a pressure region pressure designated P2 is disposed at an opposite side of the cavity 16 and is defined by a pipe portion 20 having the diameter D2 and a transition step 22. The transition step 22 and the pipe portion 20 define a transition edge K1. In a region of the step 22 and the pipe portion 20 adjacent to and including the edge K1, the pipe wall thickness is highly reduced and elastic.

A mirror image of the step 22 is shown at an exit or discharge portion 26 of the pipe cavity 16 where the pipe 12 widens from the diameter D2 to the diameter D1 with a thin-walled transition edge designated K2.

As shown in FIG. 1, the pressure P2 in the region 18 is approximately equal to the pressure Pl in the pipe 12. For this reason, edges K1 and K2 retain their original sharp-edged form and therefore induce a relatively high fluid flow resistance.

Figure 2:
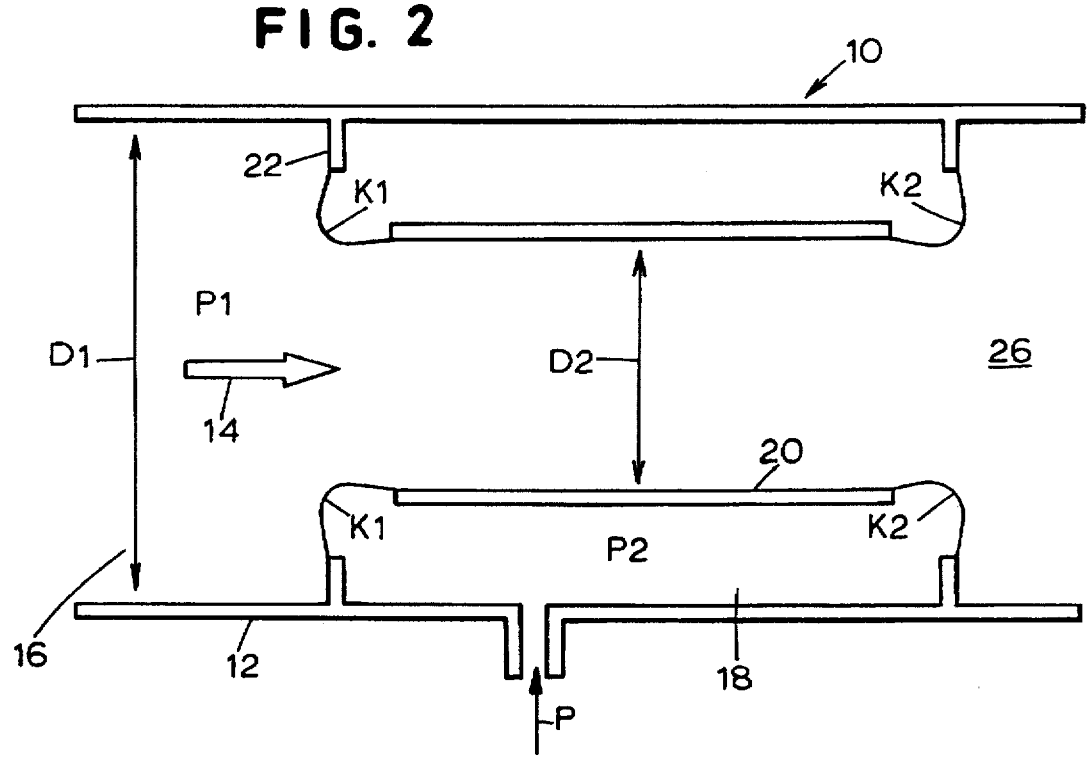
FIG. 2 is a partially schematic sectional view of the flow control device of FIG. 1 showing P2 >>P1.

On the other hand, FIG. 2 shows the same embodiment of the invention with the exception that the pressure P2 in the area 18 is very much larger than the pressure P1 inside the pipe 12. As a result, the thin-walled edges K1 and K2 deform, so that edges K1 and K2 are highly rounded. Due to the large radius of curvature of the edges K1 and K2 as shown in FIG. 2, the edges exert a small induced resistance. Therefore, the total fluid flow resistance of the flow control device is reduced correspondingly.

Alternative embodiments according to the invention are possible in which, for example, the pressure region P2 is divided into front and back pressure regions so that the shape of the front edge K1 can be adjusted independently of the back edge K2 and vice versa.

In another embodiment, several successive transition edges are provided at a flow entrance region of the device, the edges protruding into the fluid flow and being rounded to various degrees by corresponding individual application of pressure thereon. In this way incremental induced resistance changes and the desired result may be achieved.

The foregoing detailed description is given for clearness of understanding only, an no unnecessary limitations should be understood therefrom, as modifications within the scope of the invention will be apparent to those skilled in the art.

We claim:

1. A method for variably controlling fluid flow in a closed flow line having an arbitrary cross-sectional form, said method comprising:

(a) passing the fluid through a fluid control conduit having first and second portions and a transition edge, each conduit portion having a discrete substantially constant cross-sectional profile and the transition edge being disposed between the first and second portions, said cross-sectional profile of said first conduit portion defining an area smaller than an area defined by said cross-sectional profile of said second conduit portion, said transition edge defined at least in part by said cross-sectional profile of said first conduit portion; and (b) adjusting fluid flow resistance in the fluid control conduit by applying an outside pressure to said first conduit portion distinct from fluid flow pressure in the conduit, the application of the outside pressure changing the contour of the transition edge while maintaining said substantially constant cross-sectional profile of said first conduit portion.

2. A variably adjustable fluid control device comprising:

(a) first and second conduit portions, each conduit portion having a discrete substantially constant cross-sectional profile, said cross-sectional profile of said first conduit portion defining an area smaller than an area defined by said cross-sectional profile of said second conduit portion; and (b) a transition edge disposed between said first and second conduit portions being adjustable to range between a sharp and a rounded contour, said transition edge defined at least in part by said cross-sectional profile of said first conduit portion, wherein said transition edge is elastic and bendably transforms while maintaining said substantially constant cross-sectional profile of said first conduit portion when an outside pressure is applied to said first conduit portion, said outside pressure distinct from a fluid flow pressure in said device.

* * * * *